(12) United States Patent
Li et al.

(10) Patent No.: US 10,644,572 B2
(45) Date of Patent: May 5, 2020

(54) MOTOR AND GROUND STRUCTURE OF EMC ELEMENT AND/OR ESD ELEMENT THEREOF

(71) Applicant: CCL MANUFACTURING (SHENZHEN) LIMITED, Shenzhen (CN)

(72) Inventors: Mingleung Li, Shenzhen (CN); Tao Lin, Shenzhen (CN)

(73) Assignee: CCL MANUFACTURING (SHENZHEN) LIMITED, Shenzhen (CN)

( * ) Notice: Subject to any disclaimer, the term of this patent is extended or adjusted under 35 U.S.C. 154(b) by 587 days.

(21) Appl. No.: 15/502,516

(22) PCT Filed: Nov. 9, 2015

(86) PCT No.: PCT/CN2015/094116
§ 371 (c)(1),
(2) Date: Feb. 8, 2017

(87) PCT Pub. No.: WO2017/079869
PCT Pub. Date: May 18, 2017

(65) Prior Publication Data
US 2017/0271960 A1    Sep. 21, 2017

(51) Int. Cl.
*H02K 11/40* (2016.01)
*H02K 11/22* (2016.01)
(Continued)

(52) U.S. Cl.
CPC .......... *H02K 11/022* (2013.01); *H02K 5/225* (2013.01); *H02K 11/02* (2013.01); *H02K 11/026* (2013.01); *H02K 11/40* (2016.01)

(58) Field of Classification Search
CPC ...... H02K 11/022; H02K 11/40; H02K 5/225; H02K 11/02; H02K 11/026
(Continued)

(56) References Cited

U.S. PATENT DOCUMENTS 6,160,329 A * 12/2000 Ng .................. H02K 5/225
  310/40 MM
2015/0084445 A1 * 3/2015 DeFilippis ............ H02K 1/04
  310/43
(Continued)

FOREIGN PATENT DOCUMENTS

CN  203813607 U   9/2014
CN  104247228 A   12/2014
(Continued)

OTHER PUBLICATIONS

Capacitors and EMC, https://electronic-products-design.com/geek-area/electronics/emc/capacitors-and-emc, (Year: 2018).*
(Continued)

*Primary Examiner* — Terrance L Kenerly
(74) *Attorney, Agent, or Firm* — Buchanan Ingersoll & Rooney PC

(57) ABSTRACT

A motor and a ground structure of an EMC component and/or ESD component for the motor, wherein the ground structure includes a conductive housing, an insulating cover; the insulating cover is provided with an EMC component and/or ESD component, and an conductive terminal connected to the EMC component and/or ESD component; the ground structure further includes a conductive cover; the first pin of the EMC component and/or ESD component is connected to the conductive terminal; the second pin of the EMC component and/or ESD component is located between the conductive housing and the conductive cover, such that the EMC component and/or ESD component can still be (Continued)

grounded stably even when the insulating cover is deformed because of temperature and vibration.

11 Claims, 8 Drawing Sheets

(51) Int. Cl.
*H02K 5/22* (2006.01)
*H02K 11/026* (2016.01)
*H02K 11/02* (2016.01)

(58) Field of Classification Search
USPC .......................................................... 310/72
See application file for complete search history.

(56) References Cited

U.S. PATENT DOCUMENTS

2015/0091401 A1 4/2015 Buerger et al.
2015/0123504 A1 5/2015 Mili

FOREIGN PATENT DOCUMENTS

CN 104617714 A 5/2015
DE 19902433 C1 9/2000

OTHER PUBLICATIONS

International Search Report (PCT/ISA/210) dated Jul. 27, 2016, by the State Intellectual Property Office of China as the International Searching Authority for International Application No. PCT/CN2015/094116. (7 pages).

Written Opinion (PCT/ISA/237) dated Jul. 27, 2016, by the State Intellectual Property Office of China as the International Searching Authority for International Application No. PCT/CN2015/094116. (3 pages).

* cited by examiner

MOTOR AND GROUND STRUCTURE OF EMC ELEMENT AND/OR ESD ELEMENT THEREOF

FIELD OF THE INVENTION

The present application belongs to the technical field of motors, especially to a ground structure of an EMC element and/or ESD element for a motor, and a motor including the ground structure.

BACKGROUND OF THE INVENTION

Electro Magnetic Compatibility (EMC) means the ability that a device or system runs with requirements met in an electromagnetic environment where the device or system is located, at the same time, no unbearable electromagnetic interference is happened to any other device in the environment where the device or system is located. With widely application of electronic products, a variety of electrical products used in everyday life are usually equipped with not only a motor but also several other electronic products such as an enclosed constant-speed three-phase asynchronous motor which is common in industry. Since the motor gives off electromagnetic wave during working, in order to stop the motor from giving off electromagnetic wave which may affect normal operation of the electronic products nearby, a motor equipped with an EMC element is usually required. The motor with the EMC component has little effect on the normal operation of the electronic products nearby, which brings convenience to the user and reduces production cost effectively. Furthermore, in order to stop electro-static discharge (ESD), the motor is normally further equipped with an ESD component as an over-voltage protection discharger.

The motor normally includes a conductive housing configured to provide an enclosed internal working environment for the motor and an insulating cover configured to contain several electronic components and prevent the electronic components from shorting out with the conductive housing and metal cover of the motor. The conductive housing is normally made of metal which structurally possesses protective property and grounding property in circuit. The insulating cover is normally made of plastics and configured to protect each of the electronic components from shorting out with each other and the conductive housing.

Normally, an EMC component and/or ESD component of the motor is located between the conductive housing and the insulating cover of the motor such that the EMC component and/or ESD component is directly contacted to the metal conductive housing of the motor so as to achieve grounding purpose. However, when the motor is working, the temperature thereof is very high, and the insulating cover is easy to be deformed in the heat. Furthermore, the hardness of the plastic material is insufficient; therefore, when the motor suffers severe vibration, the insulating cover will be deformed. All the deformations above may create a gap between the insulating cover and the conductive housing, which makes the contact between the EMC component and/or ESD component and the metal conductive housing insufficient or unstable, and the purpose of stable grounding cannot be achieved.

SUMMARY OF THE INVENTION

In order to overcome the technical problem that the EMC component and/or ESD component of the motor cannot be grounded stably because of temperature variation and vibration, a ground structure and a motor including the ground structure are provided, the ground structure can assure that the EMC component and/or ESD component of the motor is contacted stably and firmly to the conductive housing of the motor.

In order to overcome the above technical problem, the present application provides technical solutions as follows:

A ground structure of an EMC component and/or ESD component for a motor, wherein, the ground structure includes:

a conductive housing which is a part of a motor housing;

an insulating cover configured to contain an electronic component; the insulating cover is provided with an EMC component and/or ESD component, and an conductive terminal electrically connected to the EMC component and/or ESD component; the EMC component and/or ESD component has a first pin and a second pin;

the ground structure further includes a conductive cover; the first pin of the EMC component and/or ESD component is electrically connected to the conductive terminal; the second pin of the EMC component and/or ESD component is located between the conductive housing and the conductive cover.

In one embodiment, the second pin is located between the conductive housing and the insulating cover, and further located between the conductive housing and the conductive cover.

In one embodiment, the conductive housing and/or the conductive cover is provided with an open slot; the second pin of the EMC component and/or ESD component is stretched into the open slot of the conductive housing and/or the conductive cover.

In one embodiment, the open slot is a trapezoid slot or a circular slot with an upper opening.

In one embodiment, the depth of the open slot is equal to or deeper than the diameter of the second pin.

In one embodiment, one end of the open slot is located at an intersection where the insulating cover, the conductive cover and the conductive housing meet with each other; the other end of the open slot is located within a surface where the conductive cover and the conductive housing are contacted with each other.

In one embodiment, the conductive housing has an end face; the end face of the conductive housing is tightly contacted with the end face of the conductive cover; the end face of the conductive housing and/or the conductive cover is provided with an open slot; the second pin of the EMC component and/or ESD component is provided between the conductive housing and the insulating cover, and bent into the open slot.

In one embodiment, the conductive housing is provided with several engaging components; the conductive cover is provided with engaging holes which are correspondingly matched and have the same quantity with the engaging components; the conductive housing is engaged with the engaging holes on the end face of the conductive cover through the engaging components.

In one embodiment, an open slot is provided along an edge of the engaging holes of the conductive cover, the second pin of the EMC component and/or ESD component is located between the conductive housing and the insulating cover, and stretch into the open slot inside the engaging holes in a straight direction.

In one embodiment, the conductive housing and the conductive cover are riveted such that the second pin of the EMC component and/or ESD component is fastened in the open slot.

In one embodiment, the conductive cover is provided with a plug hole; the conductive terminal passes through the plug hole and protrudes outside the conductive cover.

In one embodiment, the EMC component is a capacitance.

In one embodiment, the ESD component is a resistance.

A motor, which includes an EMC component and/or ESD component, further includes the ground structure described above; the EMC component and/or ESD component is grounded through the ground structure.

The beneficial effect of the present application is that by locating the pin of the EMC component and/or ESD component between the conductive housing and the conductive cover, the EMC component and/or ESD component can still achieve the purpose of stable grounding even when the insulating cover is deformed because of temperature and vibration, which makes sure that the EMC component and/or ESD component can be grounded perfectly all the time.

DETAILED DESCRIPTION OF THE PREFERRED EMBODIMENT

Preferred embodiments of the present application will be further described in accompany with the drawings. It should be explained that the embodiments below are only preferred implementations of the present application. The motors concerning the present application are not limited to the motor structures illustrated in the embodiments. Features not directed to specific structures of a motor in a specific embodiment can also apply to any other motor existed in the prior art, which are not limited to the specific motor structure.

Figure 1:
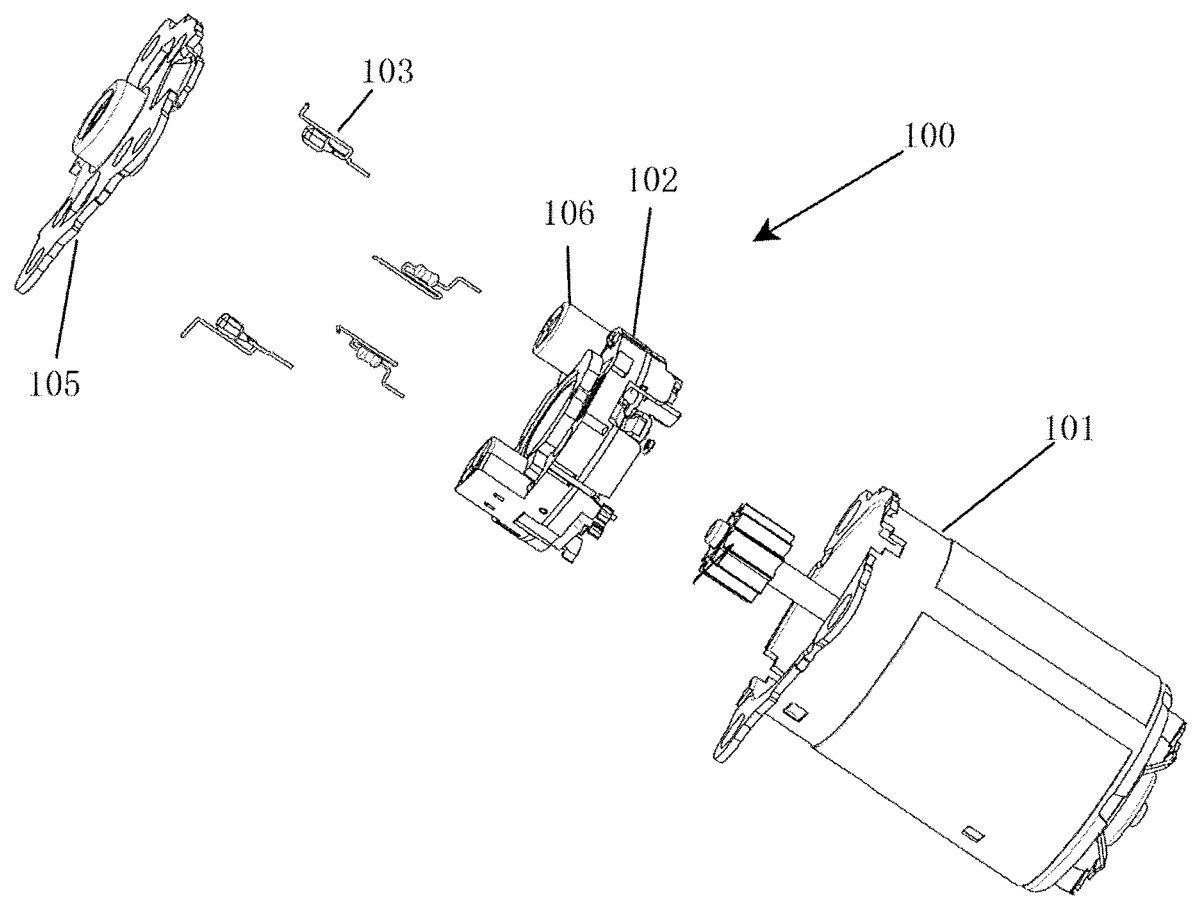
FIG. 1 is an exploded view of a motor according to an embodiment of the present application.
Figure 5:
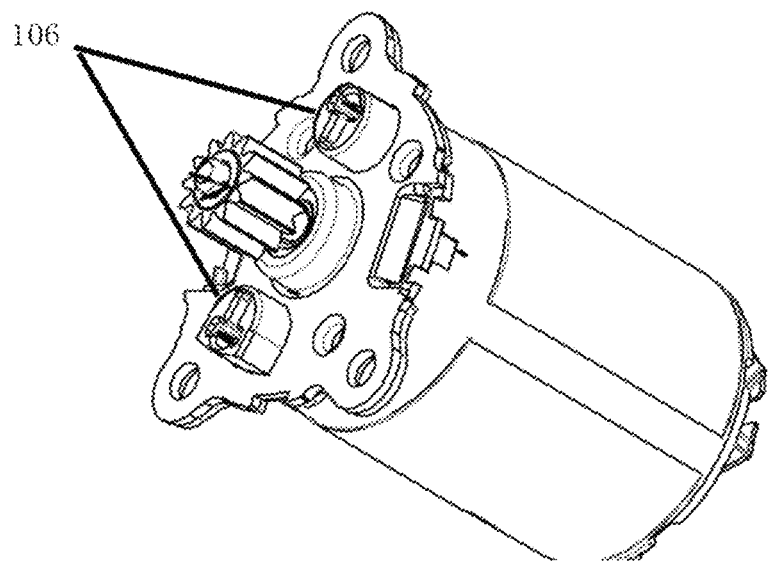
FIG. 5 is a perspective view of the motor of FIG. 1.

A preferred implementation of the present application provides a motor 100; an internal structure of the motor 100 is as shown in FIG. 1. The motor 100 includes a conductive housing 101, a conductive cover 105, and an insulating cover 102 which is located at an inner side of the conductive cover 105 and configured to contain a variety of electronic components and protect the electronic components from being shorting out with the conductive housing 101 and the conductive cover 105. The conductive housing 101 can be a part of a metal protection housing of the prior art for a motor and approximately in a cylindrical shape with an opening at one end. The insulating cover 102 is located at the inner side of the conductive cover 105 and approximately in a tubular end-face shape. The shape of the conductive cover 105 is such that when the motor is assembled completely, the conductive cover 105 can be tightly covered on the conductive housing so as to form an enclosed internal environment for the motor. During assembling the motor, the insulating cover 102 is located at the inner side of the conductive cover 105, and the conductive cover 105 is tightly covered on the conductive housing 101, such that the internal working environment of the motor is isolated from the environment outside the housing. Specifically, the electronic components can include an EMC component and/or ESD component 103 which has a first pin an a second pin. The EMC component is configured to protect electronic components with no anti-electromagnetic interference ability or poor anti-electromagnetic interference ability from electromagnetic interference; the ESD component is configured to prevent electro-static discharge. As shown in FIG. 5, the insulating cover 105 is further configured with two conductive terminals 106.

Figure 2:
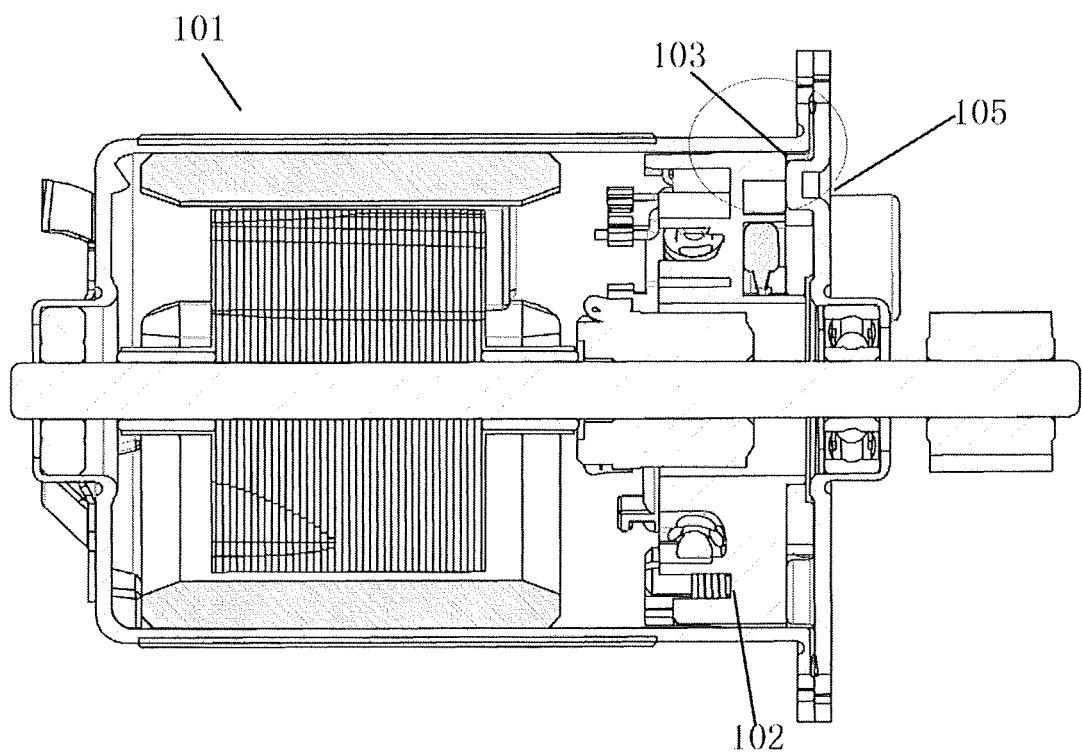
FIG. 2 is a structural view of the motor of FIG. 1 in a normal working state.

As shown in FIG. 2, one end of the conductive housing 101 facing the conductive cover 105 has an end face. When the motor 100 is in a working state, the conductive housing 105 is tightly contacted with the conductive housing 101, such that the internal space of the motor 100 forms an enclosed space. The end face of the conductive housing 101 should be capable of totally tightly contacted with the end surface of the conductive cover 105, such that the internal space of the motor forms an enclosed space.

When the motor 100 is in a normal working state, the first pin of the EMC component and/or ESD component 103 is connected to one of the conductive terminals 106; the second pin is connected to the conductive housing 101, such that the EMC component and/or ESD component 103 is directly connected to the conductive housing 101, which thereby achieve the grounding purpose, therefore, the conductive housing 101, the conductive cover 105 and the conductive terminals 106 of the motor 100 together constitute a ground structure of the preferred embodiment of the present application, which is configured to make the EMC component and/or ESD component grounded more stable.

Figure 3:
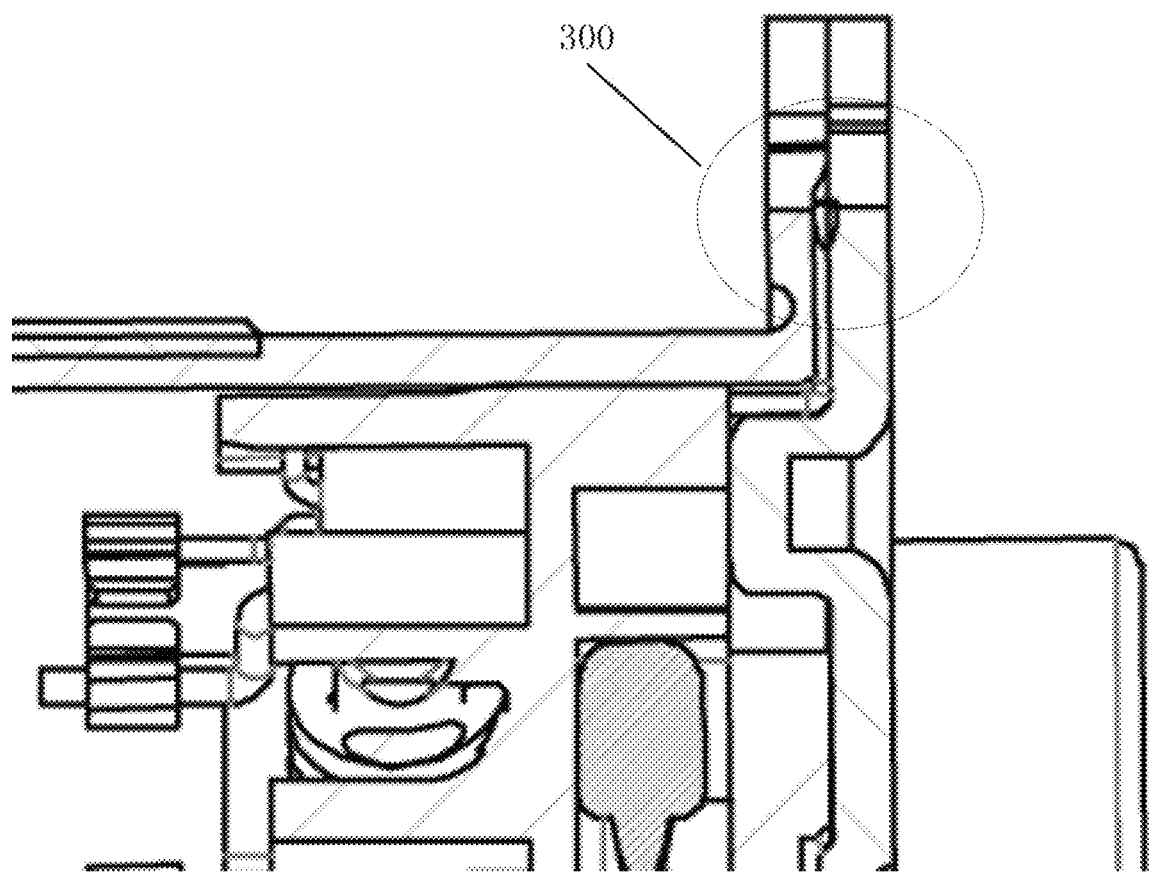
FIG. 3 is a partial enlarged view of FIG. 2.

FIG. 3 is a partial enlarged view of FIG. 2. As shown in FIG. 3, in order to overcome the defect described above, in one embodiment of the present application, the second pin of the EMC component and/or ESD component is elongated into a joint surface where the conductive housing 101 and the conductive cover 105 are tightly contacted with each other, and bent inbetween the conductive housing 101 and the conductive cover 105.

The effect of the embodiment is that because the coefficient of thermal expansion of metal is low and less affected by temperature. Therefore, by locating the second pin between the conductive housing 101 and the conductive cover 105, the second pin is less affected by alternate cooling and heating caused by the motor operation, and can achieve purpose of stable grounding. The constituted structure is more stable than traditional ground structure.

In the embodiment, the second pin is provided between the conductive housing 101 and the insulating cover 102, and between the conductive housing 101 and the conductive cover 105 in consequence. The beneficial effect is that, the second pin is provided between the conductive housing 101 and the insulating cover 102, and between the conductive housing 101 and the conductive cover 105 in consequence, thereby the second pin is double fastened, and forming more stable ground structure. However, this is only a preferred implementation of the present application. In some embodiments, the second pin is not necessarily provided between the conductive housing 101 and the insulating cover 102. Those skilled in the art can choose any way of the prior art to locate the second pin between the conductive housing 101 and the conductive cover 105 directly. For example, in another specific embodiment, the second pin can penetrate the interior of the insulating cover 102 directly, and stretch into the joint surface where the conductive housing 101 and the conductive cover 105 are tightly contacted with each other.

Figure 4:
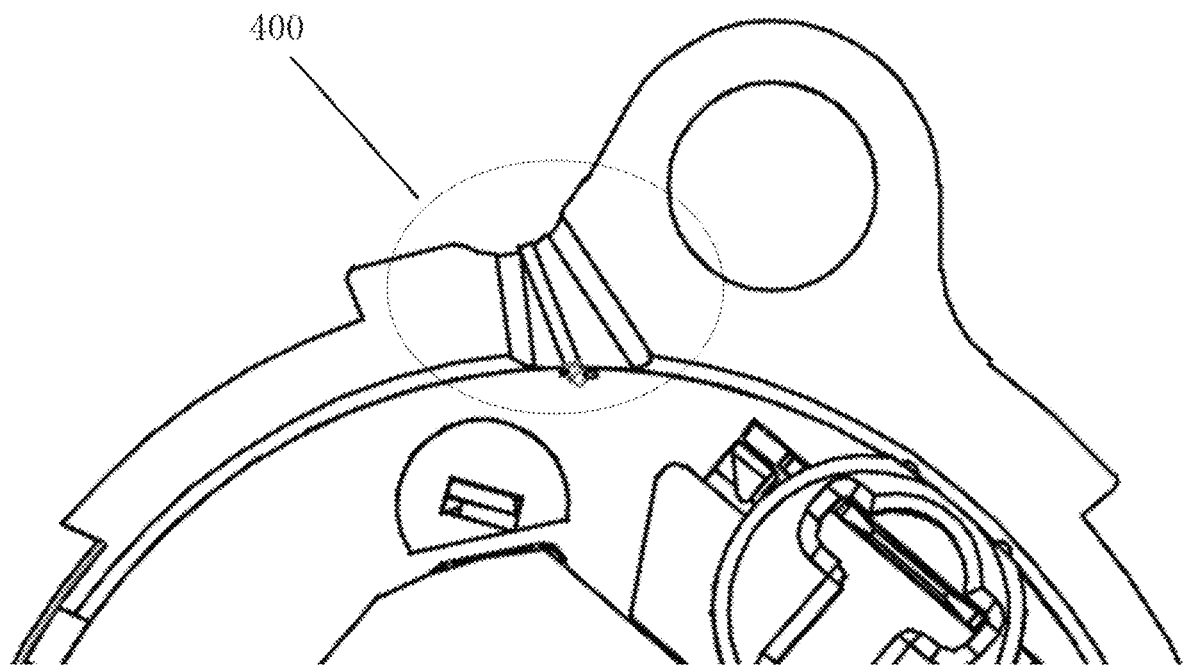
FIG. 4 is a partial enlarged view of the motor of FIG. 1 in a normal working state.

As shown in FIGS. 3-4, in another embodiment, an open slot is provided on an end face of the conductive housing 101 or on an end face of the conductive cover 105; alternatively, the end face of the conductive housing 101 and the end face of the conductive cover 105 are respectively provided with an open slot, and when the motor is in a normal working state, the open slot on the end face of the conductive housing 101 and the open slot on the end face of the conductive cover 105 are aligned with each other to form a complete slot. When the motor is in a working state (as shown in FIG. 2), the second pin of the EMC component and/or ESD component is provided between the consulting cover 102 and the conductive housing 101, and bent into the open slot. Referring to FIG. 4, the reference number 400 represents the open slot portion in the embodiment. As can be seen clearly, the open slot is located on the joint face where the conductive housing and the conductive cover are tightly contacted with each other. No matter the open slot is located at the conductive housing or the conductive cover of the motor, or both at the conductive housing and the conductive cover of the motor, the second pin can always be fastened firmly.

In another embodiment, the location of the open slot is as shown in FIG. 3, which shows that one end of the open slot is located at an intersection where the insulating cover 102, the conductive cover 105 and the conductive housing 101 meet with each other; the other end of the open slot is located within the surface where the conductive cover 105 and the conductive housing 101 are contacted with each other.

The beneficial effect of the embodiment is that, the second pin is avoided from being located between the conductive housing 101 and the conductive cover 105 directly which may create a gap between the conductive housing 101 and the conductive cover 105. Furthermore, by stretching the pin into the open slot, the second pin is fastened more stably and not easy to be shifted.

In another embodiment, the depth of the open slot is equal to or deeper than the diameter of the second pin, such that the second pin can be fastened between the conductive housing 101 and the conductive cover 105 more stably, at the same time, the sealing property of the hermetical attachment between the conductive housing 101 and the conductive cover 105 can be ensured.

In another embodiment, the open slot can be a trapezoid slot, a circular slot or an open slot in any other shape which can fasten the second pin stably, the open slot has an upper opening.

In another embodiment, when the conductive housing 101 and the conductive cover 105 are hermetically connected, the conductive housing 101 and the conductive cover 105 require to be riveted such that the second pin is fastened in the open slot more stably. The specific riveting method is not limited by the embodiment.

As shown in FIG. 5, in a specific embodiment, the conductive cover is provided with two plug holes; the insulating cover 102 located at the inner side of the conductive cover 105 is provided with two conductive terminals 106; two conductive terminals 106 respectively pass through the two plug holes and protrude outside the conductive cover 105 for connecting with an external power supply.

In another embodiment, the conductive housing 101 and the conductive cover 105 of the motor are both made of iron.

In another embodiment, the EMC component is a capacitance.

In another embodiment, the ESD component is a resistance.

In another embodiment, the number of the EMC component and/or ESD component is two or four.

Figure 6:
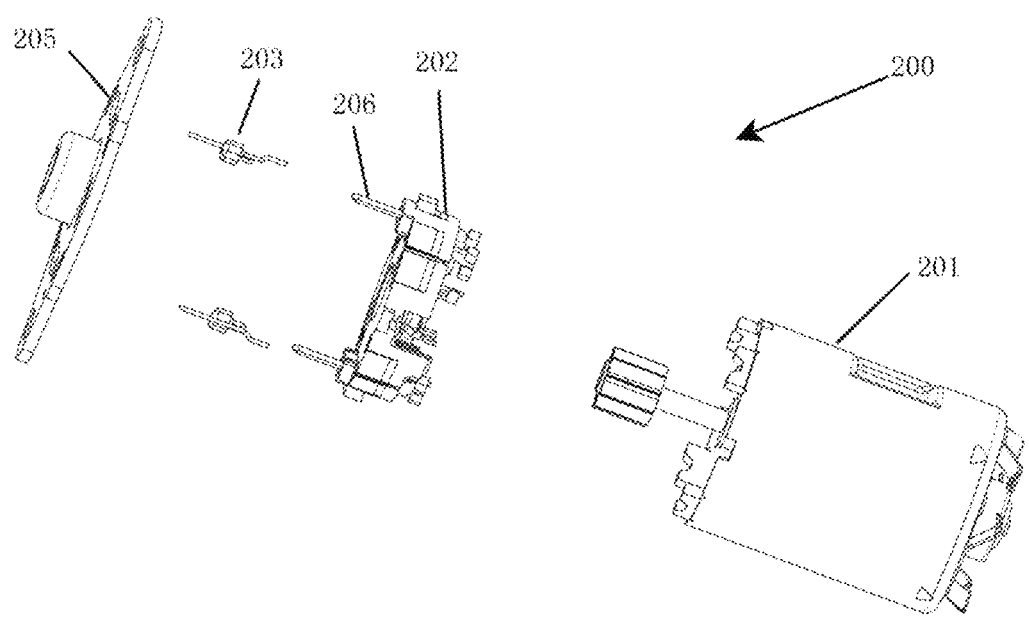
FIG. 6 is an exploded view of a motor according to another embodiment of the present application.

Another preferred implementation of the present application provides a motor 200; an internal structure of the motor 200 is as shown in FIG. 6. The motor 200 includes a conductive housing 201, a conductive cover 205, and an insulating cover 202 which is located at an inner side of the conductive cover 205 and configured to contain a variety of electronic components and protect the electronic components from being shorting out with the conductive housing 201 and the conductive cover 205. The conductive housing 201 can be a part of a metal protection housing of the prior art for a motor and approximately in a cylindrical shape with an opening at one end. The insulating cover 202 is located at the inner side of the conductive cover 205 and approximately in a tubular end-face shape. The shape of the conductive cover 205 is such that when the motor is assembled completely, the conductive cover 205 can be hermetically covered on the conductive housing so as to form an enclosed internal environment for the motor. During assembling the motor, the insulating cover 202 is located at the inner side of the conductive cover 205, and the conductive cover 205 is hermetically covered on the conductive housing 201, such that the internal working environment of the motor is isolated from the environment outside the housing. Specifically, the electronic components can include an EMC component and/or ESD component 203 which has a first pin and a second pin. The EMC component is configured to protect electronic components with no anti-electromagnetic interference ability or poor anti-electromagnetic interference ability from electromagnetic interference; the ESD component is configured to prevent electro-static discharge. The insulating cover is further configured with two conductive terminals.

Figure 7:
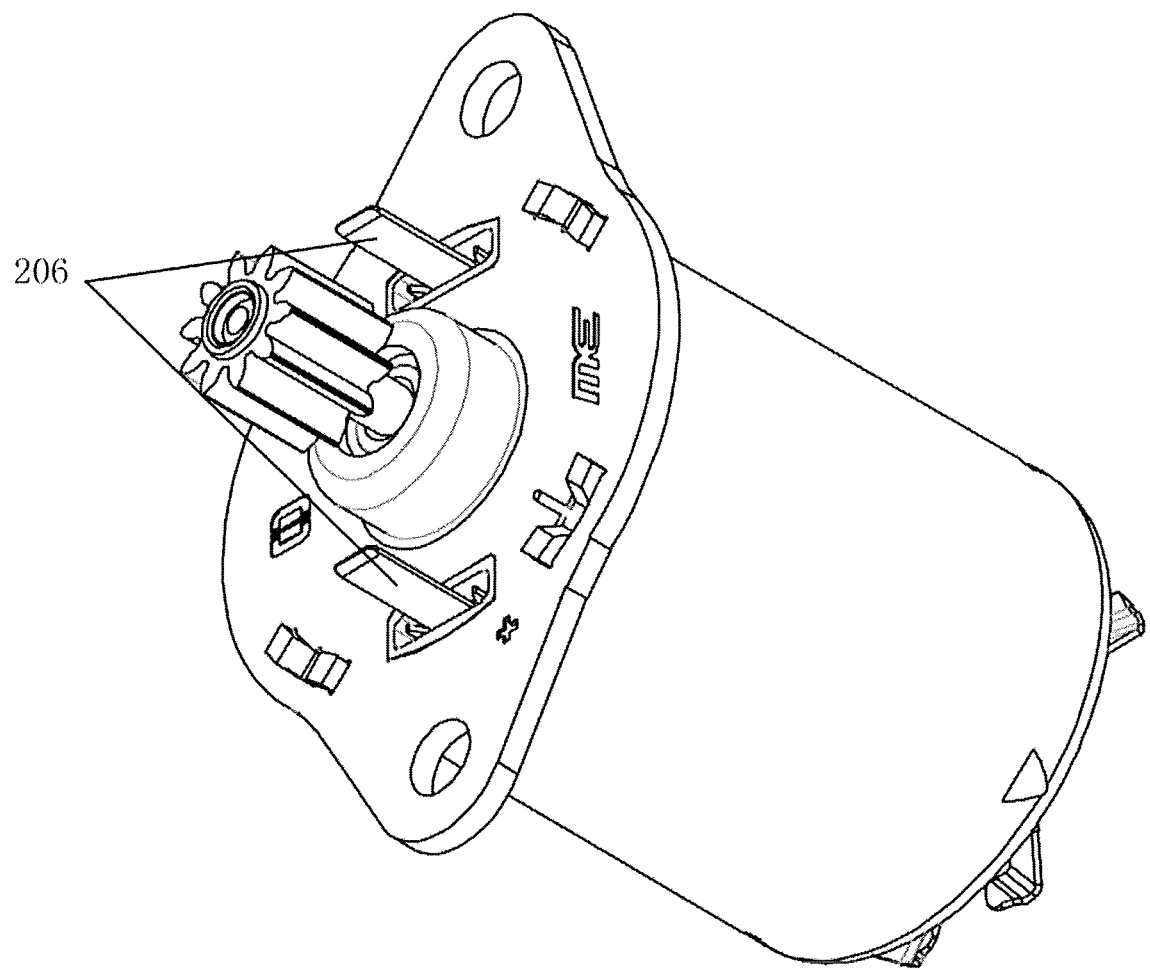
FIG. 7 is a perspective view of the motor of FIG. 6 in a normal working state.

As shown in FIG. 7, the conductive housing 201 is provided with several engaging components; the conductive cover 205 is provided with engaging holes which are correspondingly matched and have the same quantity with the engaging components. The conductive housing 201 is engaged with the engaging holes on the end face of the conductive cover 205 through the engaging components such that the interior of the motor forms an enclosed space.

When the motor 200 is in a normal working state, the first pin of the EMC component and/or ESD component 203 is connected to one of the conductive terminals 206; the second pin is connected to the conductive housing 201, such that the EMC component and/or ESD component 203 is directly connected to the conductive housing 201, which thereby achieves grounding purpose.

In one embodiment of the present application, the second pin of the EMC component and/or ESD component 203 is stretched into the engaging holes of the conductive cover 205 and located between the conductive housing 201 and the conductive cover 205.

The effect of the embodiment is that because the coefficient of thermal expansion of metal is low and less affected by temperature, therefore, by locating the second pin between the conductive housing 201 and the conductive cover 205, the second pin is less affected by alternate cooling and heating caused by the motor operation, the purpose of stable grounding can be achieved. The constituted structure is more stable than traditional ground structure.

In the embodiment, the second pin is provided between the conductive housing 201 and the insulating cover 202, and between the conductive housing 201 and the conductive cover 205 in consequence. However, the second pin is not necessarily provided between the conductive housing 201 and the insulating cover 202. Those skilled in the art can choose any way of the prior art to locate the second pin between the conductive housing 201 and the conductive cover 205 directly. For example, in another specific embodiment, the second pin can penetrate the interior of the insulating cover 202 directly, and stretch directly into the engaging holes of the conductive cover 205.

Figure 8:
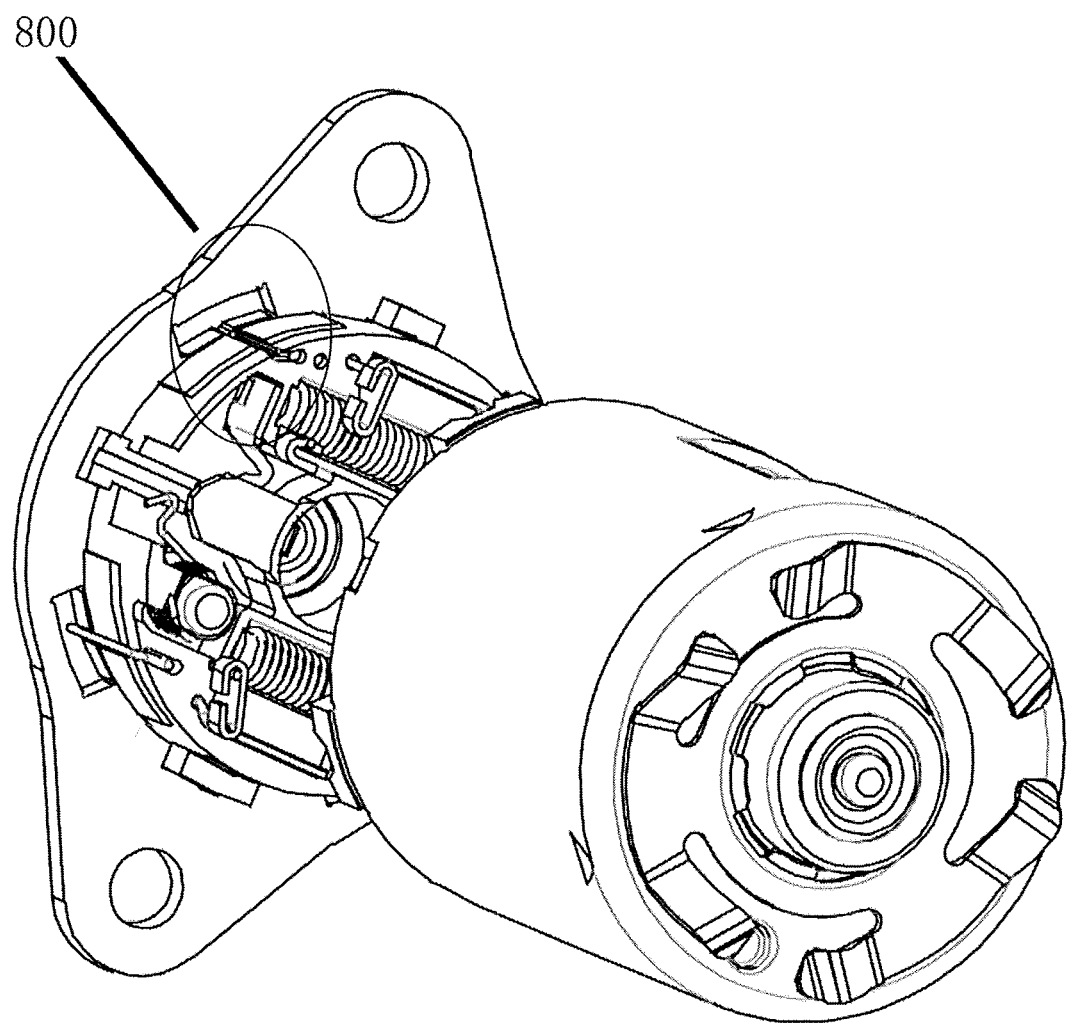
FIG. 8 is an internal structural view of the motor of FIG. 6.
Figure 9:
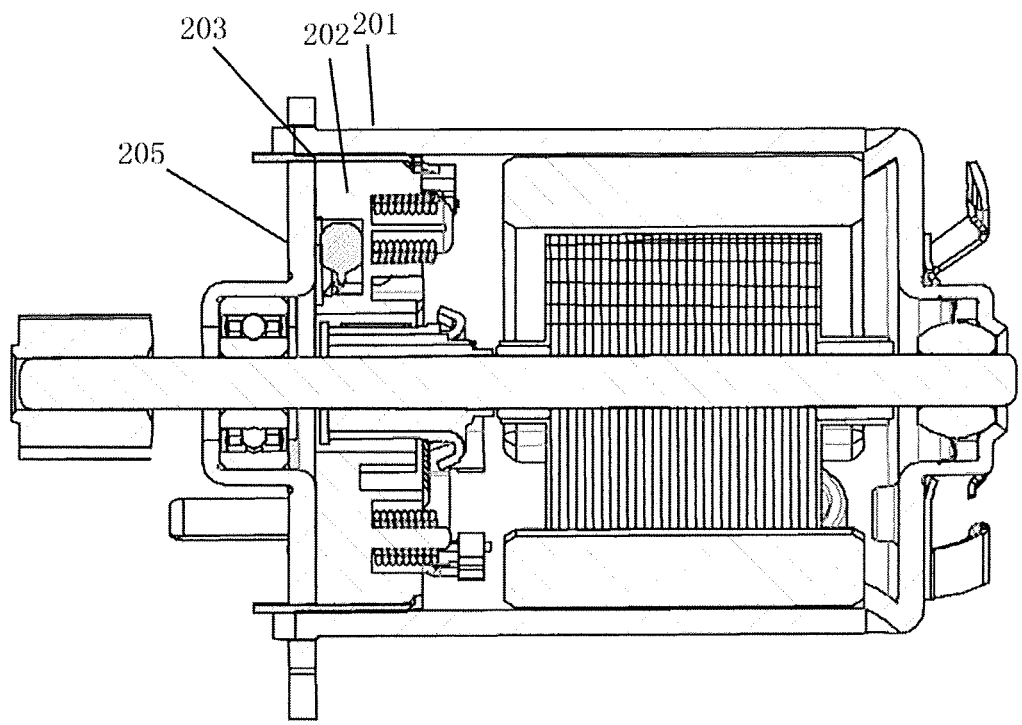
FIG. 9 is a structural view of the motor of FIG. 6 in a normal working state.
Figure 10:
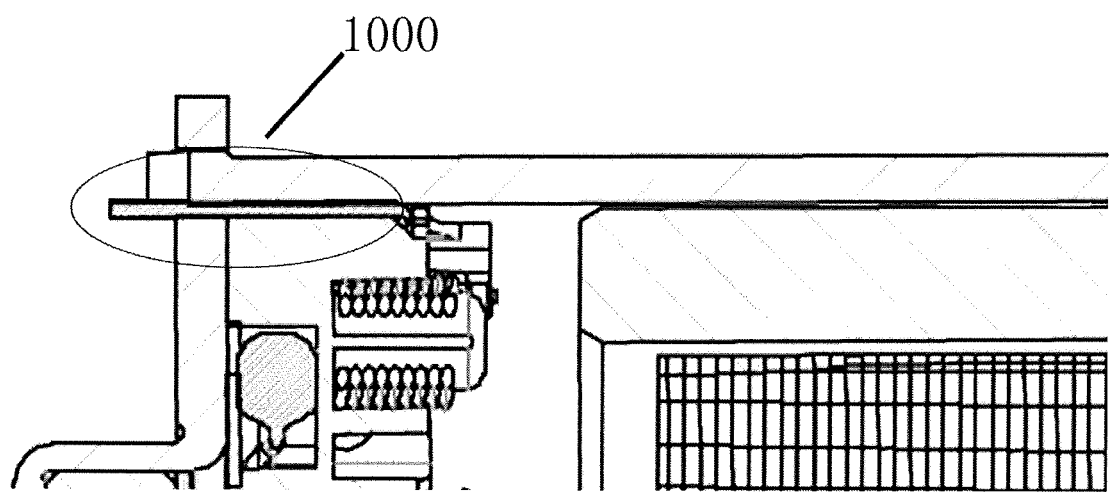
FIG. 10 is a partial enlarged view of FIG. 9.

FIG. 8 is an internal structural view of the motor according to an embodiment of the present application. As shown by the portion signified by the reference number 800 in FIG. 8, in the embodiment, (see the portion 800 of the FIG. 8).

In another embodiment, the location of the open slot is as shown in FIG. 8, which shows that one end of the open slot is located at an intersection where the insulating cover 202, the conductive cover 205 and the conductive housing 201 meet with each other; the other end of the open slot is located within the surface where the conductive cover 205 and the conductive housing 201 are contacted with each other.

The beneficial effect of the embodiment is that, the second pin is avoided from being located directly in the engaging hole of the conductive cover 205 which may create a gap between the conductive housing 201 and the conductive cover 205. Furthermore, by stretching the pin into the open slot, the second pin is fastened more stably and not easy to be shifted.

In another embodiment, the depth of the open slot is equal to or deeper than the diameter of the second pin, such that the second pin can be fastened between the conductive housing 201 and the conductive cover 205 more stably, at the same time, the sealing property of the hermetical attachment between the conductive housing 201 and the conductive cover 205 can be ensured.

In another embodiment, the open slot can be a trapezoid slot, a circular slot or an open slot in any other shape which can fasten the second pin stably, the open slot has an upper opening.

In another embodiment, when the conductive housing 201 and the conductive cover 205 are engaged with each other, the conductive housing 201 and the conductive cover 205 require to be riveted such that the second pin is fastened in the open slot more stably. The specific riveting method is not limited by the embodiment.

As shown in FIG. 7, in a specific embodiment, the conductive cover 205 is provided with two plug holes; the insulating cover 202 located at the inner side of the conductive cover 205 is provided with two conductive terminals 206; two conductive terminals 206 respectively pass through the two plug holes and protrude outside the conductive cover 205 for connecting with an external power supply.

In another embodiment, the conductive housing 201 and the conductive cover 205 of the motor are both made of iron.

In another embodiment, the EMC component is a capacitance.

In another embodiment, the ESD component is a resistance.

In another embodiment, the number of the EMC component and/or ESD component is two or four.

Furthermore, the present application further refers to a motor which includes an EMC component and/or ESD component; wherein, the motor further includes any one of the ground structures described above. The EMC component and/or ESD component achieves stable grounding through the ground structure.

The specific embodiments of the present application are described above in combination with the drawings and specific motor structures. It should be understood that the present application being described in combination with the specific motor structure is for making the principle of the present application clear and more understandable for those skilled in the art. The features and structures defined in the embodiments are not limited by the specific motor structure. For example, it is stated in combination with the motors 100 and 200 that the second pin of the EMC component and/or ESD component is located between the conductive housing and the conductive cover; the conductive housing and/or conductive cover is provided with an open slot, and the second pin is stretched into the open slot. The technical features above are described in combination with specific motor structure, however, the features do not concerns any feature of the specific motor, but utilize the common features of all the motors, which are the conductive housing and the conductive cover. Therefore, the technical solutions above are applicable to all the existing motors, but not limited to the specific motor structures.

What is claimed is:

1. A ground structure of an EMC component and/or ESD component for a motor, wherein the ground structure comprises:
a conductive housing which is a part of a motor housing;
an insulating cover configured to contain an electronic component; the insulating cover is provided with an EMC component and/or ESD component, and an conductive terminal electrically connected to the EMC component and/or ESD component; the EMC component and/or ESD component has a first pin and a second pin;
the ground structure further includes a conductive cover; the first pin of the EMC component and/or ESD component is electrically connected to the conductive terminal; the second pin of the EMC component and/or ESD component is located between the conductive housing and the conductive cover,
wherein the conduction housing and/or the conductive cover is provided with an open slot; the second pin of the EMC component and/or ESD component is stretched into the open slot of the conductive housing and/or the conductive cover; and
wherein one end of the open slot is located at an intersection where the insulating cover; the conducive cover and the conductive housing meet with each other; the other end of the open slot is located within a surface where the conductive cover and the conductive housing are contacted with each other.

2. The ground structure of claim 1, wherein the open slot is a trapezoid slot or a circular slot with an upper opening.

3. The ground structure of claim 1, wherein the depth of the open slot is equal to or deeper than the diameter of the second pin.

4. The ground structure of claim 1, wherein the conductive housing has an end face; the end face of the conductive housing is tightly contacted with the end face of the conductive cover; the end face of the conductive housing and/or the conductive cover is provided with an open slot; the second pin of the EMC component and/or ESD component is provided between the conductive housing and the insulating cover, and bent into the open slot.

5. The ground structure of claim 1, wherein the conductive housing is provided with several engaging components; the conductive cover is provided with engaging holes which are correspondingly matched and have the same quantity with the engaging components; the conductive housing is engaged with the engaging holes on the end face of the conductive cover through the engaging components.

6. The ground structure of claim 5, wherein an open slot is provided along an edge of the engaging holes of the conductive cover, the second pin of the EMC component and/or ESD component is located between the conductive housing and the insulating cover, and stretch into the open slot inside the engaging holes in a straight direction.

7. The ground structure of claim 1, wherein the conductive housing and the conductive cover are riveted such that the second pin of the EMC component and/or ESD component is fastened in the open slot.

8. The ground structure of claim 1, wherein the conductive cover is provided with a plug hole; the conductive terminal passes through the plug hole and protrudes outside the conductive cover.

9. The ground structure of claim 1, wherein the EMC component is a capacitance.

10. The ground structure of claim 1, wherein the ESD component is a resistance.

11. A motor, comprising an EMC component and/or ESD component, and further comprising the ground structure of claim 1; the EMC component and/or ESD component is grounded through the ground structure.

* * * * *